United States Patent [19]

Tobita

[11] Patent Number: 4,692,803
[45] Date of Patent: Sep. 8, 1987

[54] CATV CONVERTER HAVING PHASE LOCKED LOOP FOR SOUND CARRIER WAVE FREQUENCY CONTROL

[75] Inventor: Katsumi Tobita, Soma, Japan
[73] Assignee: Alps Electric Co., Ltd., Japan
[21] Appl. No.: 848,731
[22] Filed: Apr. 4, 1986
[30] Foreign Application Priority Data
  Apr. 4, 1985 [JP] Japan .................. 60-72044
[51] Int. Cl.⁴ .............. H04N 5/06; H04N 7/06; H04N 7/16
[52] U.S. Cl. ................... 358/143; 358/196; 358/198; 358/86
[58] Field of Search ........... 358/86, 188, 197, 198, 358/194.1, 142, 143, 144; 455/3, 4, 6

[56] References Cited

U.S. PATENT DOCUMENTS

| | | | |
|---|---|---|---|
| 3,686,431 | 8/1972 | Kitoaka | 358/143 |
| 3,924,059 | 12/1975 | Horowitz | 358/143 |
| 4,145,717 | 3/1979 | Guif | 358/121 |
| 4,163,252 | 7/1979 | Mistry | 358/118 |
| 4,571,622 | 5/1986 | Davidov | 358/197 |
| 4,591,915 | 5/1986 | Davidov | 358/197 |

Primary Examiner—Tommy P. Chin
Attorney, Agent, or Firm—Guy W. Shoup

[57] ABSTRACT

A CATV converter has a phase locked loop (PLL) circuit for controlling the sound carrier wave frequency of the audio signal component of the resulting TV signal. The PLL circuit receives as inputs a branched part of the video signal component and a part of the audio signal output of an audio modulator for providing an output control signal to the audio modulator representing a selected frequency difference to be maintained between the video carrier wave frequency of the video signal and the sound carrier wave frequency of the audio signal output of the audio modulator.

3 Claims, 3 Drawing Figures

CATV CONVERTER HAVING PHASE LOCKED LOOP FOR SOUND CARRIER WAVE FREQUENCY CONTROL

TECHNICAL FIELD

This invention relates to a CATV (community antenna television) converter, and more particularly to a CATV converter permitting volume control without degrading video signals.

PRIOR ART

Recently, also in the CATV converter technique, the digital tuning is popularized and the remote control utilizing infrared ray has come into wide use. With such popularization of digital tuning, the CATV converter is required which permitting remote volume control without diminishing video and audio quality.

In the following, a prior art CATV converter shown is exemplified with reference to FIG. 3 in which reference numerals designate as follows: 1, a cable input terminal; 2, a CATV tuner; 3, a band pass filter; and 4, a TV demodulator. The output line from the TV demodulator 4 is bifurcated into a video signal line 5a and an audio signal line 5b. The video signal line 5a is connected to a mixer 7 through a video modulator 6. The audio signal line 5b is connected separately to the mixer through a variable gain amplifier 8 and an audio modulater 9. Other reference characters 10, 11 and 12 denote the output terminal of the converter, an operational keyboard and a controller, respectively.

A TV signal group is input at the cable input terminal 1, and an intended broadcast channel is selected in accordance with the control of CATV tuner 2 through the controller 12 by operation of the keyboard 11. The received signal of the selected channel is supplied to the TV demodulator 4 through the band pass filter 3. The TV demodulator demodulates not only the video signal component into a base band video signal but also the audio signal component into a base band audio signal. The base band video signal is remodulated by the video modulator 6 into a signal of a designated frequency band and supplied as a TV video signal component to one input terminal of the mixer 7. On the other hand, the base band audio signal is amplified to have a desired amplifier by a variable gain amplifier 8. The gain of the variable amplifier 8 is controlled by operation of the keyboard 11 through the controller 12. The amplified audio signal is modulated by the audio modulator 9 into a signal of a frequency band having a designated carrier frequency difference from that of the aforesaid TV video signal, and applied as TV audio signal component to the other terminal of the mixer 7. The mixer 7 synthesize the TV video and audio signal components, and the synthesized signal is supplied as a TV signal from the output terminal 10 of the converter to a TV receiver.

With the prior art CATV converter, there have been problems: it is designed that an input video signal component of a TV signal group is demodulated, subsequently the demodulated video signal component being again modulated into a TV video signal component of a specified frequency band by the video modulator 6, and this, though it has volume control function, brings distortion of the TV video signal component and degradation of S/N of the video signal associated with both demodulation and remodulation. Change in of frequency band is performed of the TV video signal component by the video modulator 6 and of the TV audio signal component by the voice modulator 9, respectively. In the case where the audio modulator 9, or others are affected with frequency drift, there is tendency to produce variation in frequency difference between the frequency band of the TV video signal component and that of the TV audio signal component. Further the converter needs the video modulator 6 having a relatively complex configuration, which brings high price.

SUMMARY OF THE INVENTION

It is an object of the invention to solve the above-mentioned problems with the prior art CATV converter, and thus to provide a CATV converter having a volume controlling function and permitting to produce TV picture with little distortion and to retain constant the frequency difference between the frequency band of the TV video signal component and that of the TV audio signal component, even if frequency drift or the like occurs in the CATV tuner and so on, and easy to be incorporated in IC with consequent reduction in cost.

For achieving this object, a CATV converter according to the invention has the features which comprises extracting video and audio signal components from a CATV converter signal of a selected channel, on one hand, bifurcating the video signal compartment in two parts, supplying one part thereof to a mixer and the other part to a PLL circuit, on the other hand, including an audio modulator permitting the oscillation frequency of the sound carrier wave to be variable, controlling the oscillation frequency of the sound carrier wave in accordance with comparison with the frequency of the vision carrier wave extracted from the video signal component by a PLL circuit in order to change the oscillation frequency of the sound carrier wave into that different by a designated frequency from the frequency of he video carrier wave, demodulating the audio signal component into an audio signal, the audio signal being supplied to an audio sound modulator and there imprinted onto the audio carrier wave to generate a second audio signal component consisting of a carrier wave having a designated frequency, supplying the second audio signal component to the mixer, the second audio signal component being mixed with the video signal component, and supplying the output of the mixer, as TV signal, to a TV receiver.

In the CATV converter according to the invention, the video signal component is subjected to neither modulation nor demodulation, and so no concomitant video (or TV picture) distortion to modulation and demodulation occurs. On the other hand, the audio signal component is demodulated into an audio signal and gain-controlled, this permitting free volume control in the converter. Besides, in spite of enabling volume control like this, the sound carrier wave in the audio signal component is subjected to frequency-conversion into a frequency different by a designated frequency from the video carrier wave in accordance with the comparison with the frequency of the video carrier wave by the PLL circuit, and thus a designated frequency difference between the video and audio carrier waves is retained constant thus enabling audio demodulation in an inter carrier system TV receiver.

DESCRIPTION OF THE PREFERRED EMBODIMENTS

Figure 1:
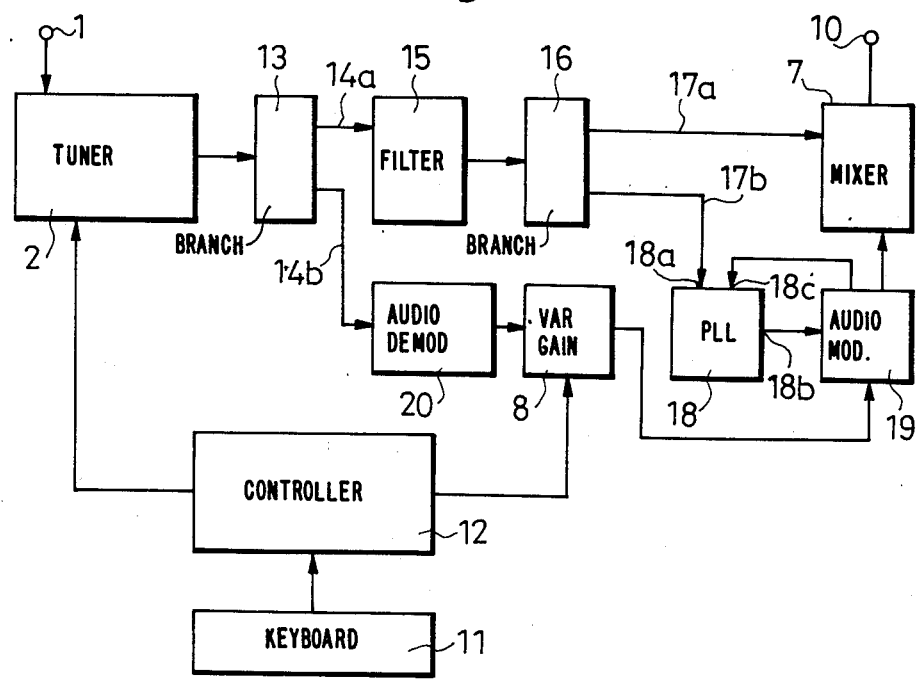
FIG. 1 is a block circuit diagram of a CATV converter according to the invention.
Figure 2:
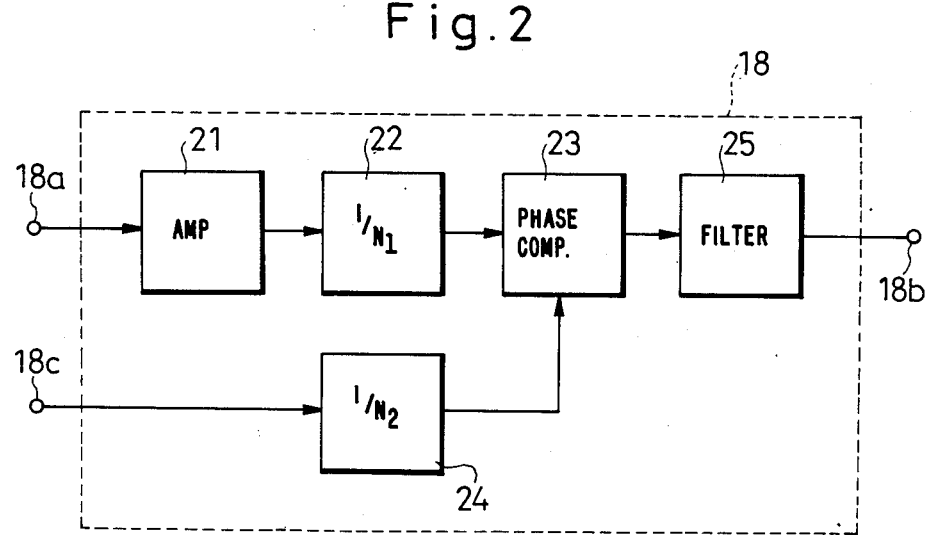
FIG. 2 is a block diagram showing the configuration of a PLL circuit for use in the same converter of FIG. 1.
Figure 3:
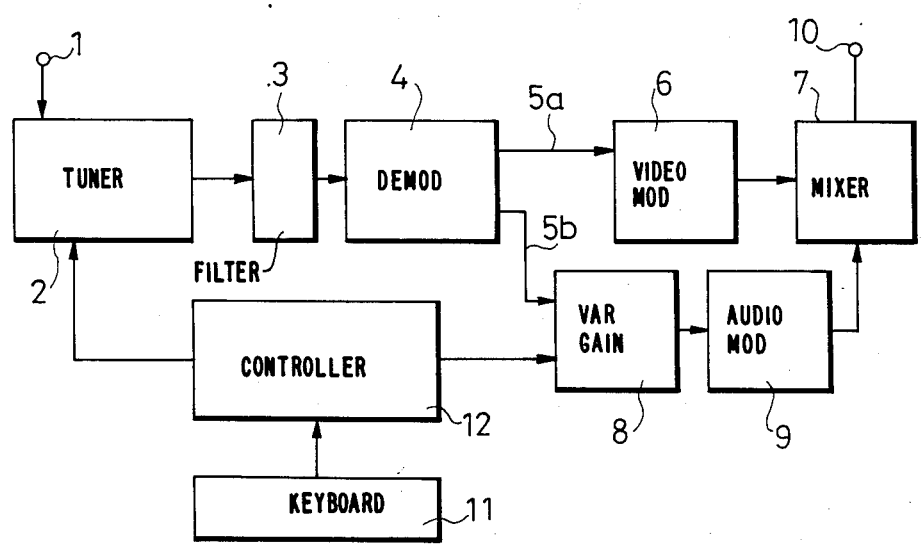
FIG. 3 is a block circuit diagram of a prior art CATV circuit.

An embodiment of the invention will be described with reference to FIGS. 1 and 2 below: identical or equivalent components or parts in FIGS. 1 and 2 are designated by the same reference numerals as those in FIG. 3, and redescription of these are omitted here.

The construction of the embodiment will be described under. A CATV tuner 2 is connected a first signal branching point 13. One branch line 14a from there is connected to a second branching point 16 through a band pass filter 15 allowing only the video signal component to pass. One line 17a from the second branching point 16 is connected to a mixer 7 and the other line 17b is connected to the input terminal 18a of a PLL circuit 18 which will be described in detail later with reference to FIG. 2. The PLL circuit 18 is connected to a audio modulator 19 which causes the oscillation frequency of the sound carrier wave to be variable. The control signal output terminal 18b of the PLL circuit 18 is connected so that the oscillation frequency of the sound carrier wave is to be controlled by the PLL circuit 18. Besides, one line for sound carrier wave signal leaded from the audio modulator 19 is connected to the other input terminal 18c in the PLL circuit 18.

The other branch line 14b from the branching point 13 is connected to an audio modulator 19 through an audio demodulator 20, followed by a variable-gain amplifier 8.

The configuration of the PLL circuit 18 is in detail illustrated in FIG. 2, in which reference numerals designate: 21, a limiter amplifier which amplifies the video signal component; 22, a first frequency divider; 23, phase comparator; 24, second frequency divider which divides the frequency of the sound carrier wave; and 25, a low-pass filter connected to a control signal output terminal 18b.

In the following, the mode of operation will be described: The CATV tuner 2 is actuated by the operation of keyboard 11 to select a required broadcast channel. The TV signal of a selected channel is bifurcated at the branching point 13. A part of the TV signal is supplied to the band pass filter 15 where only the video signal is extracted and again bifurcated at the second branching point 16. The major part of the video signal component is supplied to the mixer 7 along the branch line 17a and the rest is input as a reference signal component to the PLL circuit 18.

The other part of the TV signal component branched at the first branching point 13 is demodulated by the audio demodulator 20 into a base band audio signal which is supplied to the succeeding variable gain amplifier 8 and there its amplitude level is controlled into a required one by keyboard operation. The thus arbitrarily gain-controlled signal is input as modulating signal to the audio modulator 19.

Regarding the PLL circuit 18, a video signal component input from the terminal 18a is amplified by the limiter amplifier 21, and the vision carrier signal of the video signal component is fed to the first divider 22, where the frequency of the video carrier wave is divided in a ratio of $1/N_1$. The frequency-divided vision carrier wave is input as a reference signal to the phase comparator 23. On the other hand, the sound carrier wave component generated by the audio modulator 19 is applied to the other input terminal 18c and frequency-divided in a ratio of $1/N_2$ by the second divider 24. The frequency-divided sound carrier wave is input as a comparison signal to the phase comparator 23. The phase comparator 23 performs comparison between the vision carrier wave signal and sound carrier signal frequency-divided in different prescribed ratios, respectively, and outputs the corresponding control signal having the resulting phase differences to the audio modulator 19 through the lowpass filter 25. In the audio modulator 19, the oscillation frequency of the sound carrier wave is controlled by the control signal to change it into a frequency different by a designated frequency from the frequency of the video carrier wave. For example, for NTSC system, this frequency difference is 4.5 MHz, and, assuming that the vision and sound carrier wave frequencies are 61.25 MHz and 65.75 MHz, respectively, and the frequency-division ratios of the first and second frequency-divider 22 and 24, $1/N_1$ and $1/N_2$, are 1/245 and 1/263, respectively, then the oscillation frequency of the sound carrier wave is exactly controlled to change into a frequency having a designated frequency difference of 4.5 MHz from the frequency of the vision carrier wave. The sound carrier wave having such exactly-controlled frequency difference is modulated by the audio signal in the audio modulator 19 to create a new audio signal component. The new audio signal component is resynthesized with the video signal component in a mixer 7, and the resultant TV signal is supplied from the output terminal 10 of the converter to a TV receiver.

As described above, the present invention has the feature that the video signal component is supplied to a mixer without undergoing any modulation and demodulation and, the audio signal component is demodulated into an audio signal, which is in turn gaincontrolled and remodulated into a new audio signal component. The sound carrier wave of the new audio signal component is input to a PLL circuit, and there the frequency of the sound carrier wave is compared with the frequency of the vision carrier wave of the video signal component to change the sound carrier wave into a frequency having a designated difference from that of the vision carrier wave, the thusobtained audio signal component being mixed with the video signal component and the resultant TV signal being generated. This construction provides the advantages of the invention that TV pictures having little video distortion is displayed; even if the audio modulator and other components are effected with drift, the frequency difference between the vision and sound carrier waves is retained constant, and thus permits stable audio demodulation in an intercarrier system TV receiver and free volume control in the converter. Neither a video demodulator nor modulator of relatively complex configuration is necessary, and instead of these, the PLL circuit or other digital circuit is used, and it is easy to be incorporated in IC, and other effects including reduction in cost are produced.

What is claimed is:

1. A CATV converter comprising:
   a tuner receiving an input CATV signal for a signal of a selected channel;
   first branching means for bifurcating the selected signal from the tuner into a video carrier and a sound carrier;

an audio demodulator receiving the sound carrier for demodulating the sound carrier into an audio signal and providing the audio signal to an audio modulator;

second branching means for bifurcating the video carrier from the first branching means into two parts;

a mixer receiving a first part of said branched video carrier and a sound carrier output from said audio modulator for providing an output TV signal;

a phase locked loop circuit receiving as inputs a second part of said branched video carrier and a part of the sound carrier output of said audio modulator for providing an output control signal to said audio modulator representing a selected frequency difference to be maintained between a frequency of the video carrier and a frequency of the sound carrier output provided to said mixer; and said audio modulator receiving as inputs the audio signal from said audio demodulator and the output control signal of said PLL circuit for providing the sound carrier output having a said sound carrier output frequency which is variably modulated in accordance with the output control signal of said PLL circuit in order to maintain said frequency difference from the video carrier frequency.

2. A CATV converter as claimed in claim 1, wherein said PLL circuit includes a first frequency divider receiving the input second part of said video carrier for dividing the input video carrier by a first ratio, a second frequency divider receiving the input sound carrier output for dividing the sound carrier output by a second ratio, a phase comparator receiving the frequency divided input video carrier from said first frequency divider and the frequency divided sound carrier output from said second frequency divider for comparing the two frequency-divided carriers and outputting the output control signal representing the differences between these carriers.

3. A CATV converter as claimed in claim 1, further comprising a signal gain controller, and a variable gain amplifier connected between said audio demodulator and said audio modulator for amplifying the audio signal in accordance with operation of said signal gain controller.

* * * * *